United States Patent
Hirai et al.

(10) Patent No.: US 7,493,917 B2
(45) Date of Patent: Feb. 24, 2009

(54) RUBBER COMPOSITION FOR AUTOMOTIVE NON-WATER LIQUID DELIVERY HOSE AND AUTOMOTIVE NON-WATER LIQUID DELIVERY HOSE USING THE SAME

(75) Inventors: Ryo Hirai, Komaki (JP); Atsuo Miyajima, Inuyama (JP)

(73) Assignee: Tokai Rubber Industries, Ltd., Komaki-shi, Aichi-ken (JP)

( * ) Notice: Subject to any disclaimer, the term of this patent is extended or adjusted under 35 U.S.C. 154(b) by 0 days.

(21) Appl. No.: 12/038,382

(22) Filed: Feb. 27, 2008

(65) Prior Publication Data

US 2008/0202619 A1 Aug. 28, 2008

(30) Foreign Application Priority Data

Feb. 27, 2007 (JP) .............................. 2007-047731

(51) Int. Cl.
*F16L 11/00* (2006.01)
(52) U.S. Cl. ..................... 138/126; 138/137; 428/36.91
(58) Field of Classification Search ................. 138/137, 138/141, 126; 428/36.91
See application file for complete search history.

(56) References Cited

U.S. PATENT DOCUMENTS

| | | | | |
|---|---|---|---|---|
| 4,081,502 A | * | 3/1978 | Blumel et al. ................ 264/140 |
| 4,734,305 A | * | 3/1988 | Sugimoto et al. ........... 428/36.2 |
| 4,870,995 A | * | 10/1989 | Igarashi et al. .............. 138/126 |
| 4,905,735 A | | 3/1990 | Akiyoshi |
| 5,380,571 A | * | 1/1995 | Ozawa et al. ............... 428/36.9 |
| 6,184,295 B1 | * | 2/2001 | Okuyama .................... 525/192 |
| 6,213,155 B1 | | 4/2001 | Furuta et al. |
| 6,237,641 B1 | | 5/2001 | Niki et al. |
| 6,267,148 B1 | | 7/2001 | Katayama et al. |
| 6,467,509 B1 | | 10/2002 | Iio et al. |
| 6,534,578 B1 | | 3/2003 | Daikai et al. |
| 6,543,785 B1 | | 4/2003 | Katayama et al. |
| 6,679,295 B2 | * | 1/2004 | Daikai et al. ................. 138/126 |
| 6,759,109 B2 | | 7/2004 | Kanbe et al. |

FOREIGN PATENT DOCUMENTS

| JP | 6-24326 A | 2/1994 |
|---|---|---|
| JP | 8-113769 A | 5/1996 |

* cited by examiner

*Primary Examiner*—James F Hook
(74) *Attorney, Agent, or Firm*—Westerman, Hattori, Daniels & Adrian, LLP.

(57) ABSTRACT

A rubber composition for an automotive non-water liquid delivery hose, which has good adhesion, comprises (A) chloroprene rubber, and (B) ethylene-propylene-diene terpolymer containing 3% to 11% by weight of ethylidene norbornene and having a Mooney viscosity ($ML_{1+4}$ at 100° C.) in the range of 20 to 150, wherein the mixture ratio by weight of the component (A) and the component (B) is set in the range of (A)/(B)=97/3 to 75/25.

3 Claims, 1 Drawing Sheet

FIGURE
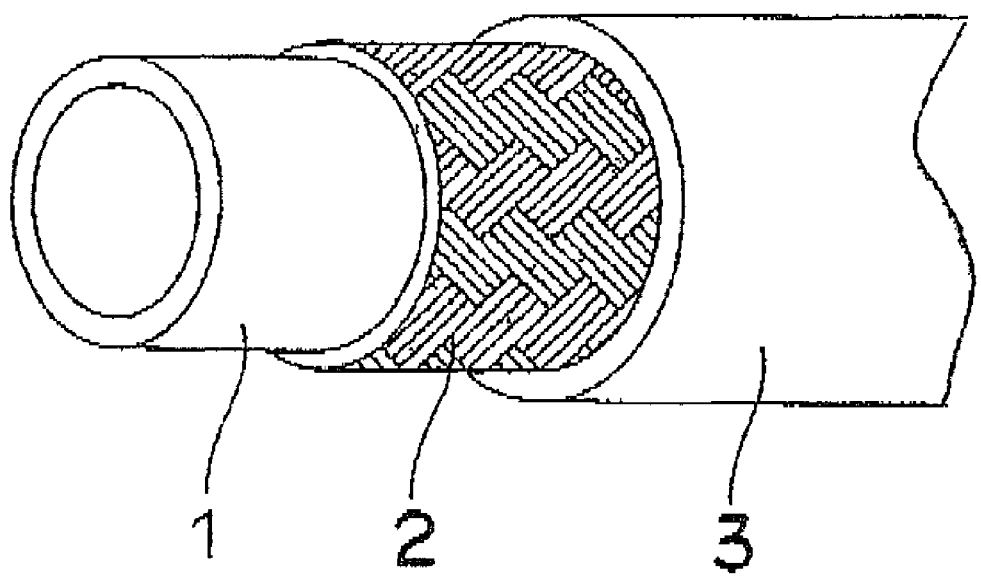

US 7,493,917 B2

RUBBER COMPOSITION FOR AUTOMOTIVE NON-WATER LIQUID DELIVERY HOSE AND AUTOMOTIVE NON-WATER LIQUID DELIVERY HOSE USING THE SAME

BACKGROUND OF THE INVENTION

1. Field of the Invention

The present invention relates to a rubber composition for an automotive non-water liquid delivery hose, and an automotive non-water liquid delivery hose using the same. More particularly, the invention relates to a rubber composition used for an automotive non-water liquid delivery hose such as a vacuum brake hose, a fuel hose, an oil hose and the like, and an automotive non-water liquid delivery hose using the same.

2. Description of the Related Art

In general, a vacuum brake hose (also known as a master back hose) used for a vacuum servo unit for a brake connects a brake booster and an intake manifold (an engine) to each other, and has the function of transmitting a negative pressure generated in the intake manifold to the brake booster while absorbing vibrations of the engine and vibrations caused during driving. The vacuum brake hose is used for a circuit which transmits the negative pressure generated by the air intake of the engine to the brake booster to thereby increase a braking force and which also decreases an operating force of the brake. A fuel hose, on the other hand, connects parts of a fuel system to each other, and is required to have the function of safely transporting gasoline which is a fuel for automotive vehicles, light oil, or a fuel incorporating alcohol, methyl ester and the like without leakage and evaporation. An oil hose is required to transport oil and to have the function of appropriately transmitting a positive pressure exerted upon oil.

Since nonpolar hydrocarbon liquid and mist such as mineral oil and fuel pass through these hoses, acrylonitrile-butadiene rubber (NBR) which is an oil-resistant rubber is predominantly used as the material of an inner layer of such hoses, and chloroprene rubber (CR) having relatively good properties of ozone resistance and oil resistance is used as the material of an outer layer thereof. An example of the above-mentioned vacuum brake hose has been proposed which includes a tubular inner layer formed by using acrylonitrile-butadiene rubber (NBR), a reinforcing fiber layer formed on an outer peripheral surface of the tubular inner layer, and an outer layer formed by using chloroprene rubber (CR) on an outer peripheral surface of the reinforcing fiber layer, with an intermediate adhesive layer of chlorosulfonated polyethylene rubber (CSM) being provided between the inner layer and the reinforcing fiber layer, as disclosed in Japanese Patent Application Laid-Open No. 8-113769 (1996).

However, the hose disclosed in Japanese Patent Application Laid-Open No. 8-113769 (1996) is disadvantageous in the increase in costs because the intermediate adhesive layer of CSM, which is a relatively thick film, is present between the inner layer and the reinforcing fiber layer. The reduction in the thickness of the above-mentioned intermediate adhesive layer, however, results in insufficient interlayer adhesion between the inner layer and the outer layer. This makes it difficult to sufficiently meet requirements for higher performance and longer life of the hose product.

On the other hand, an example of an automotive water delivery hose proposed is an automotive hydraulic brake hose including an outer layer made of a blend of ethylene-propylene-diene and chloroprene rubber at a ratio of 10/0 to 3/7 by weight, as disclosed in Japanese Patent Application Laid-Open No. 6-24326 (1994).

However, the automotive hydraulic brake hose disclosed in Japanese Patent Application Laid-Open No. 6-24326 (1994) is not a non-water liquid delivery hose but a water delivery hose. It is therefore impossible to directly apply the hose structure disclosed in Japanese Patent Application Laid-Open No. 6-24326 (1994) to a non-water liquid delivery hose such as a vacuum brake hose and the like. Specifically, the outer layer of the automotive hydraulic brake hose disclosed in Japanese Patent Application Laid-Open No. 6-24326 (1994) is prepared by blending chloroprene rubber (CR) into ethylene-propylene-diene (EPDM) serving as a matrix. Thus, the direct application of the outer layer of the disclosed automotive hydraulic brake hose to a non-water liquid delivery hose such as a vacuum brake hose, a fuel hose and an oil hose presents a problem in significantly poor oil resistance.

SUMMARY OF THE INVENTION

In view of the foregoing, it is an object of the present invention to provide a rubber composition for an automotive non-water liquid delivery hose having good adhesion, and an automotive non-water liquid delivery hose using the same.

To accomplish the above-mentioned object, a first aspect of the present invention is intended for a rubber composition for an automotive non-water liquid delivery hose comprising: (A) chloroprene rubber; and (B) ethylene-propylene-diene terpolymer containing 3% to 11% by weight of ethylidene norbornene and having a Mooney viscosity ($ML_{1+4}$ at 100° C.) in the range of 20 to 150, wherein the mixture ratio by weight of the component (A) and the component (B) is set in the range of (A)/(B)=97/3 to 75/25. A second aspect of the present invention is intended for an automotive non-water liquid delivery hose comprising: a tubular inner layer; a reinforcing fiber layer formed on an outer peripheral surface of the inner layer; and an outer layer formed on an outer peripheral surface of the reinforcing fiber layer, the inner layer containing as an essential component at least one selected from the group consisting of acrylonitrile-butadiene rubber, fluoro rubber, acrylic rubber and hydrin rubber, the outer layer being made of a rubber composition containing (A) chloroprene rubber, and (B) ethylene-propylene-diene terpolymer containing 3% to 11% by weight of ethylidene norbornene and having a Mooney viscosity ($ML_{1+4}$ at 100° C.) in the range of 20 to 150, wherein the mixture ratio by weight of the component (A) and the component (B) is set in the range of (A)/(B)=97/3 to 75/25.

The present inventors have diligently studied to obtain a rubber composition for an automotive non-water liquid delivery hose which is excellent in adhesion and ozone resistance. Then, the present inventors have recalled the use of chloroprene rubber (CR) as a matrix in a blend system of chloroprene rubber and ethylene-propylene-diene terpolymer (EPDM). However, since the chloroprene rubber is lower in mixing, temperature than ordinary rubbers, it is necessary to select the EPDM having a low viscosity for blending. The double bond of EPDM is considered to contribute to a reaction (cross-linking) with oil-resistant rubber such as acrylonitrile-butadiene rubber (NBR) which is an inner layer material for the automotive non-water liquid delivery hose. For this reason, the present inventors have conducted experiments about ethylidene norbornene (ENB) content which is an index of the amounts of double bonds (or the amount of diene) of the EPDM. As a result, the present inventors have found that good adhesion to the oil-resistant rubber such as NBR is obtained by selecting ethylene-propylene-diene terpolymer (EPDM) (the component (B)) containing 3% to 11% by weight of ethylidene norbornene (ENB) and having a Mooney viscosity ($ML_{1+4}$ at 100° C.) in the range of 20 to 150, and setting the mixture ratio by weight of the component (A) and the component (B) in the range of (A)/(B)=97/3 to 75/25. Thus, the present inventors have attained the present invention.

In this manner, the rubber composition for the automotive non-water liquid delivery hose according to the present invention contains chloroprene rubber as a matrix, and ethylene-propylene-diene terpolymer containing 3% to 11% by weight of ethylidene norbornene and having a Mooney viscosity ($ML_{1+4}$ at 100° C.) in the range of 20 to 150 which are mixed in predetermined proportions. Thus, the rubber composition for the automotive non-water liquid delivery hose is excellent in adhesion to oil-resistant rubber such as NBR. Additionally, the rubber composition for the automotive non-water liquid delivery hose, which contains a small amount of EPDM excellent in weather resistance, has improved ozone resistance.

Further, the automotive non-water liquid delivery hose according to the present invention has an outer layer made of the above-mentioned special rubber composition. Thus, the automotive non-water liquid delivery hose is excellent in interlayer adhesion between the inner layer made of oil-resistant rubber such as NBR and the outer layer. It is inferred that this comes from the following reason. The automotive non-water liquid delivery hose has the effect of making gas and solvents which serve as a hindrance to adhesion difficult to accumulate to improve the intimate contact between the inner layer made of oil-resistant rubber such as NBR and the outer layer. Additionally, the increase in double bonds which are reactive sites improves the adhesion.

These and other objects, features, aspects and advantages of the present invention will become more apparent from the following detailed description of the present invention when taken in conjunction with the accompanying drawings.

BRIEF DESCRIPTION OF THE DRAWING

The single FIGURE is a schematic view showing an example of an automotive non-water liquid delivery hose according to the present invention.

DESCRIPTION OF THE PREFERRED EMBODIMENT

A preferred embodiment according to the present invention will now be described in detail.

A rubber composition for an automotive non-water liquid delivery hose according to the present invention is obtained by using chloroprene rubber (a component (A)) and a specific ethylene-propylene-diene terpolymer (a component (B)).

The most striking characteristic of the present invention is that the mixture ratio by weight of the chloroprene rubber (the component (A)) and the specific ethylene-propylene-diene terpolymer (the component (B)) is set in the range of (A)/(B)=97/3 to 75/25.

The above-mentioned chloroprene rubber (the component (A)) is not particularly limited, but chloroprene rubber of the type which is not modified with sulfur is preferably used because of its advantage in heat resistance.

The specific ethylene-propylene-diene terpolymer (EFDM) (the component (B)) used herein together with the above-mentioned chloroprene rubber(the component (A)) contains 3% to 11% by weight of ethylidene norbornene (ENB) and has a Mooney viscosity ($ML_{1+4}$ at 100° C.) in the range of 20 to 150.

Ethylidene norbornene (ENB) serving as a third component is copolymerized with the above-mentioned specific ethylene-propylene-diene terpolymer (the component (B) ) The specific ethylene-propylene-diene terpolymer (the component (B)) contains 3% to 11%, preferably 3.5% to 10.0%, by weight of ethylidene norbornene (ENB). If the specific ethylene-propylene-diene terpolymer is too low in ENB content, the rubber composition is poor in adhesion. If the specific ethylene-propylene-diene terpolymer is too high in ENB content, the rubber composition is prone to scorch, which results in failure in normal extrusion of the hose.

The above-mentioned specific ethylene-propylene-diene terpolymer (the component (B)) has a Mooney viscosity ($ML_{1+4}$ at 100° C.) in the range of 20 to 150, preferably in the range of 30 to 100. If the Mooney viscosity is too low, tubes (hoses) become sticky with each other to result in disfigurement. If the Mooney viscosity is too high, extrudability is deteriorated.

According to the present invention, the mixture ratio by weight of the chloroprene rubber (the component (A)) and the specific ethylene-propylene-diene terpolymer (the component (B)) is required to be set in the range of (A)/(B)=97/3 to 75/25, preferably in the range of (A)/(B)=95/5 to 80/20. If the component (A) is too large in amount (or the component (B) is too small in amount), the rubber composition is poor in weather resistance and ozone resistance. If the component (A) is too small in amount (or the component (B) is too large in amount), the rubber composition is poor in adhesion.

The rubber composition for the automotive non-water liquid delivery hose according to the present invention may appropriately contain a vulcanizing agent, a vulcanization accelerator, a vulcanizing aid, an antioxidant, a scorch retarder, a reinforcing material (carbon black and the like), a white filler (a calcium carbonate filler, a silica filler, a clay filler, a talc filler and the like), a plasticizer, (process oil, vegetable oil, ester oil and the like), an acid receiver, a processing aid (process oil, wax), a fire retarding material (aluminum hydroxide and the like), and the like, as required, in addition to the above-mentioned components (A) and (B). These are used either alone or in combination.

Examples of the vulcanizing agent include 2-mercaptoimidazoline, 2-mercaptobenzimidazole, and the like. These are used either alone or in combination. Of these, a combined use of 2-mercaptoimidazoline and 2-mercaptobenzimidazole is preferable.

The blending amount of the above-mentioned vulcanizing agent is preferably in the range of 0.3 to 5 parts by weight, particularly preferably in the range of 0.5 to 2 parts by weight, based upon 100 parts by weight of the components (A) and (B) combined.

The above-mentioned vulcanization accelerator is not particularly limited. Examples of the vulcanization accelerator include a thiazole vulcanization accelerator, a sulfonamide vulcanization accelerator, a thiuram vulcanization accelerator, an aldehyde ammonia vulcanization accelerator, an aldehyde amine vulcanization accelerator, a guanidine vulcanization accelerator, a thiourea vulcanization accelerator, and the like. These are used either alone or in combination of these, the thiuram vulcanization accelerator is preferable because of its excellent crosslinking reactivity.

Examples of the above-mentioned thiazole vulcanization accelerator include dibenzothiazyl disulfide (MBTS), 2-mercaptobenzothiazole (MBT), sodium 2-mercaptobenzothiazole (NaMBT), zinc 2-mercaptobenzothiazole (ZnMBT), and the like. These are used either alone or in combination. Of these, dibenzothiazyl disulfide (MBTS) and 2-mercaptobenzothiazole (MBT) are preferably used because of their excellent crosslinking reactivity.

Examples of the above-mentioned sulfenamide vulcanization accelerator include N-oxydiethylene-2-benzothiazolyl sulfenamide (NOBS), N-cyclohexyl-2-benzothiazolyl sulfenamide (CBS), N-t-butyl-2-benzothiazolyl sulfenamide (BBS), N,N'-dicyclohexyl-2-benzothiazoyl sulfenamide, and the like.

Examples of the above-mentioned thiuram vulcanization accelerator include tetramethylthiuram disulfide (TMTD), tetraethylthiuram disulfide (TETD), tetrabutylthiuram disulfide (TBTD), tetrakis(2-ethylhexyl)thiuram disulfide (TOT), tetrabenzylthiuram disulfide (TBzTD), and the like.

The blending amount of the above-mentioned vulcanization accelerator is preferably in the range of 0.5 to 7 parts by weight, particularly preferably in the range of 0.5 to 5 parts by weight, based upon 100 parts by weight of the components (A) and (B) combined.

The above-mentioned vulcanizing aid is not particularly limited. Examples of the vulcanizing aid include zinc white (ZnO), stearic acid, magnesium oxide, and the like. These are used either alone or in combination.

The blending amount of the above-mentioned vulcanizing aid is preferably in the range of 1 to 25 parts by weight, particularly preferably in the range of 3 to 10 parts by weight, based upon 100 parts by weight of the components (A) and (B) combined.

The above-mentioned antioxidant is not particularly limited. Examples of the antioxidant include an amine-ketone antioxidant, an aromatic secondary amine antioxidant, a monophenol antioxidant, a bisphenol antioxidant, a polyphenol antioxidant, a benzimidazole antioxidant, a dithiocarbamate antioxidant, a dithiocarbamic acid antioxidant, a thiourea antioxidant, a phosphorous acid antioxidant, an organic thio acid antioxidant, a xanthate antioxidant, a special wax antioxidant, and the like. These are used either alone or in combination.

The blending amount of the above-mentioned antioxidant is preferably in the range of 0.1 to 10.0 parts by weight, particularly preferably in the range of 0.5 to 5 parts by weight, based upon 100 parts by weight of the components (A) and (B) combined.

The above-mentioned carbon black is not particularly limited. The carbon black may be of various grades such as SAF, ISAF, HAF, MAF, FEF, GPF, SRF, FT and MT grades, for example. These are used either alone or in combination. Of these, the FEF carbon black is preferably used in terms of costs, durability and the like.

The blending amount of the above-mentioned carbon black is preferably in the range of 20 to 150 parts by weight, particularly preferably in the range of 40 to 100 parts by weight, based upon 100 parts by weight of the components (A) and (B) combined.

Examples of the above-mentioned acid receiver include magnesium oxide, hydrotalcite and the like. These are used either alone or in combination. Of these, a combined use of magnesium oxide and hydrotalcite is preferable in terms of the ability to efficiently capture chlorine released from the CR.

The blending amount of the above-mentioned acid receiver is preferably in the range of 1 to 30 parts by weight, particularly preferably in the range of 3 to 20 parts by weight, based upon 100 parts by weight of the components (A) and (B) combined.

Examples of the above-mentioned processing aid (process oil) include a naphthenic oil, a paraffinic oil, an aromatic oil, and the like. These are used either alone or in combination.

The blending amount of the above-mentioned processing aid is preferably in the range of 1 to 50 parts by weight, particularly preferably in the range of 3 to 30 parts by weight, based upon 100 parts by weight of the components (A) and (B) combined.

The rubber composition for the automotive non-water liquid delivery hose according to the present invention is prepared, for example, by appropriately blending the antioxidant and the like, as required, with the above-mentioned chloroprene rubber (the component (A)) and the specific ethylene-propylene-diene terpolymer (the component (B)), and then kneading these components by using a kneading machine such as a roll, a kneader, a Banbury mixer and the like.

Next, the automotive non-water liquid delivery hose according to the present invention will be described.

The automotive non-water liquid delivery hose according to the present invention has a structure, for example, such that a reinforcing fiber layer 2 is formed on an outer peripheral surface of an inner layer 1, and an outer layer 3 is formed on an outer peripheral surface of the reinforcing fiber layer 2, as shown in the single FIGURE.

An inner layer material for the formation of the above-mentioned inner layer 1 used herein is at least one oil-resistant rubber selected from the group consisting of acrylonitrile-butadiene rubber (NBR), fluoro rubber (FKM), acrylic rubber (ACM) and hydrin rubber (CO, ECO). Of these, the NBR is preferably used in terms of oil resistance, costs and the like.

The above-mentioned NBR is not particularly limited. For example, the NBR having an acrylonitrile amount (AN amount) ranging from 27 to 39 is preferably used in terms of oil resistance.

The above-mentioned inner layer material may appropriately contain a vulcanizing agent, a vulcanization accelerator, a vulcanizing aid, an antioxidant, a scorch retarder, a reinforcing material (carbon black and the like), a white filler (a calcium carbonate filler, a silica filler, a clay filler, a talc filler and the like), a plasticizer (process oil, vegetable oil, ester oil and the like), an acid receiver, a processing aid (process oil and wax), a fire retarding material (aluminum hydroxide and the like), and the like, as required, in addition to the above-mentioned oil-resistant rubber such as the NBR. The components of the above-mentioned vulcanizing agent and the like used herein are similar to those illustrated above.

The above-mentioned inner layer material is prepared by appropriately blending the antioxidant and the like, as required, with the above-mentioned oil-resistant rubber such as the NBR and the like, and then kneading these components by using a kneading machine such as a roll, a kneader, a Banbury mixer and the like.

Reinforcing fiber for the formation of the above-mentioned reinforcing fiber layer 2 is not particularly limited. Examples of the reinforcing fiber include vinylon (polyvinyl alcohol) fiber, polyamide (nylon) fiber, aramid fiber, polyethylene terephthalate (PET) fiber, wire, and the like. Of these, the polyethylene terephthalate (PET) fiber is especially preferably used.

A method of weaving the above-mentioned reinforcing fiber is not particularly limited. Examples of the method of weaving include spiraling, braiding, knitting, and the like.

An outer layer material for the formation of the above-mentioned outer layer 3 used herein is a rubber composition containing:

(A) chloroprene rubber; and
(B) ethylene-propylene-diene terpolymer containing 3% to 11% by weight of ethylidene norbornene and having a Mooney viscosity ($ML_{1+4}$ at 100° C.) ranging from 20 to 150, in which the mixture ratio by weight of the component (A) and the component (B) is set in the range of (A)/(B)=97/3 to 75/25.

The rubber composition containing the above-mentioned chloroprene rubber (the component (A)) the specific EPDM (the component (B)) and the like used herein is similar to the above-mentioned rubber composition for the automotive non-water liquid delivery hose according to the present invention.

The automotive non-water liquid delivery hose according to the present invention is produced in a manner to be described below. The above-mentioned inner layer material is extruded into a tubular form, and thereafter the reinforcing fiber (polyester fiber and the like) is woven by spiraling on a surface of the tubular inner layer material to form the reinforcing fiber layer 2. Next, the surface of the reinforcing fiber layer 2 is impregnated with an adhesive component by uniform shower-coating or dipping in a closed cycle Thereafter, the outer layer material is extruded. This produces the automotive non-water liquid delivery hose (as shown in the single FIGURE) in which the reinforcing fiber layer 2 is formed on the outer peripheral surface of the tubular inner layer 1 and the outer layer 3 is formed on the outer peripheral surface of the reinforcing fiber layer 2.

The above-mentioned adhesive component is not particularly limited. Examples of the adhesive component include CR, NBR, carbon black, a white filler (calcium carbonate, magnesium silicate, silica, clay and the like) and the like which are dissolved in an organic solvent such as toluene, ethyl acetate, methyl ethyl ketone (MEK) and the like.

The automotive non-water liquid delivery hose according to the present invention has an inside diameter preferably in the range of 2 to 50 mm, particularly preferably in the range of 5 to 40 mm, and has an outside diameter preferably in the range of 2.6 to 70 mm, particularly preferably in the range of 3 to 50 mm. The inner layer 1 has a thickness preferably in the range of 0.3 to 10 mm, particularly preferably in the range of 0.5 to 5 mm. The outer layer 3 has a thickness preferably in the range of 0.3 to 10 mm, particularly preferably in the range of 0.5 to 5 mm.

The structure of the automotive non-water liquid delivery hose according to the present invention is not limited to that illustrated in the single FIGURE. As an example, an outermost layer (or a protector layer) may be formed on an outer peripheral surface of the outer layer 3. Examples of a material for the outermost layer (or the protector layer) include EPDM, urethane and the like, which may be foams.

The automotive non-water liquid delivery hose according to the present invention is used, for example, not only as a vacuum brake hose, a fuel hose, an oil hose and the like, but also as an industrial hose required to have oil resistance and weather resistance, such as an oil transfer rubber hose and the like. The above-mentioned oil hose is used, for example, for oil piping of an ATF (automatic transmission fluid), a PSF (power steering fluid), an engine oil and the like in vehicles (including a tractor, a cultivator and the like) such as an automotive vehicle. Specific examples of the oil hose include a torque-converter hose, an engine oil cooler hose, a power steering hose and the like.

EXAMPLES

Next, inventive examples will be described in conjunction with comparative examples. It should be noted that the present invention is not limited to the inventive examples to be described below.

Example 1

Preparation of Inner Layer Material

An inner layer material was prepared by blending 100 parts by weight of NBR (NIPOL DN202 manufactured by ZEON Corporation; having an AN amount of 31), 70 parts by weight of FEF (Fast Extrusion Furnace) carbon black (SEAST SO manufactured by Tokai Carbon Co., Ltd.) as a reinforcing material, 40 parts by weight of magnesium silicate (MISTRON VAPOR TALC manufactured by Nihon Mistron Co., Ltd.) as a white filler, 15 parts by weight of a plasticizer (ADK CIZER RS-107 manufactured by ADEKA Corporation), 1 part by weight of stearic acid (LUNAC S30 manufactured by Kao Corporation), 5 parts by weight of zinc white (two types of zinc oxide manufactured by Mitsui Mining & Smelting Co., Ltd.), 2 parts by weight of a condensate of acetone and diphenylamine (NON-FLEX BA manufactured by Seiko Chemical Co., Ltd.) as an amine-ketone antioxidant, 2 parts by weight of octylated diphenylamine (NOCLAC AD manufactured by Ouchi Shinko Chemical Industrial Co., Ltd.) as a long alkyl chain substituted diphenylamine antioxidant, 2 parts by weight of N-phenyl-N'-isopropyl-p-phenylenediamine (OZONONE 3C manufactured by Seiko Chemical Co., Ltd.) as an antioxidant, 0.5 part by weight of a vulcanizing agent (sulfur), 1.5 parts by weight of tetramethylthiuram disulfide (SANCELER TT manufactured by Sanshin Chemical Industry Co., Ltd.) as a vulcanization accelerator and 1.5 parts by weight of N-cyclohexyl-2-benzothiazyl sulfenamide (SANCELER CZ manufactured by Sanshin Chemical Industry Co., Ltd.) as a vulcanization accelerator, and then kneading other than vulcanization-related ones of the above-mentioned components by using a Banbury mixer and the vulcanization-related ones of the above-mentioned components by using a roll.

Preparation of Adhesive Component

An adhesive component was prepared by kneading 100 parts by weight of CR (DENKA CHLOROPRENE A-40 manufactured by Denki Kagaku Kogyo Kabushiki Kaisha), 20 parts by weight of magnesium silicate (MISTRON VAPOR TALC manufactured by Nihon Mistron Co., Ltd.) as a white filler, 2 parts by weight of 2-mercaptoimidazoline (SANCELER 22C manufactured by Sanshin Chemical Industry Co., Ltd.) as a vulcanization accelerator, 5 parts by weight of zinc oxide and 5 parts by weight of magnesium oxide (KYOWA MAG #150 manufactured by Kyowa Chemical Industry Co., Ltd.) together by using a roll, and dissolving these components in toluene, xylene and the like so that the rubber components fell in the range of 5% to 10% by weight.

Preparation of Outer Layer Material

An outer layer material was prepared by blending components listed in Table 1 below in proportions shown in Table 1, and kneading other than vulcanization-related ones of these components by using a Banbury mixer and the vulcanization-related ones of these components by using a roll.

Production of Hose

The above-mentioned inner layer material was extruded into a tubular form. Then, reinforcing fiber (PET fiber or filaments; 1500 deniers) was woven on a surface of the tubular inner layer material by spiraling 1 warp by 24 wefts to form a reinforcing fiber layer. Next, the surface of the reinforcing fiber layer was impregnated with the above-mentioned adhesive component by uniform shower-coating in a closed cycle. Thereafter, the outer layer material was extruded. This produced a hose (having an inside diameter of 8.7 mm and an outside diameter of 17.5 mm) in which the reinforcing fiber layer was formed on the outer peripheral surface of a tubular inner layer (having a thickness of 3.0 mm) and an outer layer (having a thickness of 1.2 mm) was formed on the outer peripheral surface of the reinforcing fiber layer.

Examples 2-5 and Comparative Examples 1-4

An outer layer material was prepared according to Example 1 except that the blending amounts of the components of the outer layer material were changed, as shown in Tables 1 and 2 below. Examples 2-5 and Comparative Examples 1-4 were formed in a manner similar to Example 1 except for the use of this outer layer material. Thus, hoses (having an inside diameter of 8.7 mm and an outside diameter of 17.5 mm) were produced in which the reinforcing fiber layer was formed on the outer peripheral surface of the tubular inner layer (having a thickness of 3.0 mm) and the outer layer (having a thickness of 1.2 mm) was formed on the outer peripheral surface of the reinforcing fiber layer.

TABLE 1

Outer Layer Material

| | | Example | | | | |
|---|---|---|---|---|---|---|
| | | 1 | 2 | 3 | 4 | 5 |
| CR (Component A) | | 97 | 80 | 75 | 80 | 80 |
| Component B | EPDM-A | 3 | 20 | 25 | — | — |
| | EPDM-B | — | — | — | 20 | — |
| | EPDM-C | — | — | — | — | 20 |
| EPDM-a | | — | — | — | — | — |
| EPM | | — | — | — | — | — |
| FEF Carbon Black | | 50 | 50 | 50 | 50 | 50 |
| Heavy Calcium Carbonate | | 25 | 25 | 25 | 25 | 25 |
| Rapeseed Oil | | 20 | 20 | 20 | 20 | 20 |
| Stearic Acid | | 1 | 1 | 1 | 1 | 1 |
| Zinc White | | 10 | 10 | 10 | 10 | 10 |
| Highly-Activated Magnesium | | 5 | 5 | 5 | 5 | 5 |
| Hydrotalcite | | 5 | 5 | 5 | 5 | 5 |
| Antioxidant A | | 2 | 2 | 2 | 2 | 2 |
| Antioxidant B | | 2 | 2 | 2 | 2 | 2 |
| Antioxidant C | | 1 | 1 | 1 | 1 | 1 |
| 2-Mercaptoimidazoline | | 0.5 | 0.5 | 0.5 | 0.5 | 0.5 |
| 2-Mercaptobenzimidazole | | 0.5 | 0.5 | 0.5 | 0.5 | 0.5 |
| Tetramethylthiuram Disulfide | | 0.5 | 0.5 | 0.5 | 0.5 | 0.5 |

(part by weight)

TABLE 2

Outer Layer Material

| | | Comparative Example | | | |
|---|---|---|---|---|---|
| | | 1 | 2 | 3 | 4 |
| CR (Component A) | | 100 | 60 | 80 | 80 |
| Component B | EPDM-A | — | 40 | — | — |
| | EPDM-B | — | — | — | — |
| | EPDM-C | — | — | — | — |
| EPDM-a | | — | — | 20 | — |
| EPM | | — | — | — | 20 |
| FEF Carbon Black | | 50 | 50 | 50 | 50 |
| Heavy Calcium Carbonate | | 25 | 25 | 25 | 25 |
| Rapeseed Oil | | 20 | 20 | 20 | 20 |
| Stearic Acid | | 1 | 1 | 1 | 1 |
| Zinc White | | 10 | 10 | 10 | 10 |
| Highly-Activated Magnesium | | 5 | 5 | 5 | 5 |
| Hydrotalcite | | 5 | 5 | 5 | 5 |
| Antioxidant A | | 2 | 2 | 2 | 2 |
| Antioxidant B | | 2 | 2 | 2 | 2 |
| Antioxidant C | | 1 | 1 | 1 | 1 |
| 2-Mercaptoimidazoline | | 0.5 | 0.5 | 0.5 | 0.5 |
| 2-Mercaptobenzimidazole | | 0.5 | 0.5 | 0.5 | 0.5 |
| Tetramethylthiuram Disulfide | | 0.5 | 0.5 | 0.5 | 0.5 |

(part by weight)

The components of the outer layer material listed in Tables 1 and 2 above are as follows:

CR (Component (A))
DENKA CHLOROPRENE M-40 (of the type which is not modified with sulfur) manufactured by Denki Kagaku Kogyo Kabushiki Kaisha EPDM-A (Component (B))
ESPRENE 5214 (containing 11% by weight of ENB and having a Mooney viscosity ($ML_{1+4}$ at 100° C.) of 35) manufactured by Sumitomo Chemical Co., Ltd.

EPDM-B (Component (B))
ESPRENE 505A (containing 10% by weight of ENB and having a Mooney viscosity ($ML_{1+4}$ at 100° C.) of 47) manufactured by Sumitomo Chemical Co., Ltd.

EPDM-C (Component (B))
ESPRENE 552 (containing 3% by weight of ENB and having a Mooney viscosity ($ML_{1+4}$ at 100° C.) of 121) manufactured by Sumitomo Chemical Co., Ltd.

EPDM-a
ESPRENE 553 (containing 5% by weight of ENB and having a Mooney viscosity ($ML_{1+4}$ at 100° C.) of 152) manufactured by Sumitomo Chemical Co., Ltd.

EPM
ESPRENE 201 (containing 0% by weight of ENB and having a Mooney viscosity ($ML_{1+4}$ at 100° C.) of 43) manufactured by Sumitomo Chemical Co., Ltd.

Reinforcing Material
FEF (Fast Extrusion Furnace) carbon black (SEAST SO manufactured by Tokai Carbon Co., Ltd.)

White Filler
Heavy calcium carbonate (WHITON SB manufactured by Shiraishi Calcium Kaisha Ltd.)

Plasticizer
Rapeseed oil (Rapeseed oil manufactured by Ajinomoto Co., Inc.)

Stearic Acid
LUNAC S30 manufactured by Kao Corporation.

Zinc White
Two types of zinc oxide manufactured by Mitsui Mining & Smelting Co., Ltd.

Acid Receiver A
Highly-activated magnesium (KYOWA MAG #150 manufactured by Kyowa Chemical Industry Co., Ltd.)

Acid Receiver B
Hydrotalcite [$Mg_{4.5}Al_2(OH)_{13}CO_3 \cdot 3.5H_2O$] (DHT-4A manufactured by Kyowa Chemical Industry Co., Ltd.)

Antioxidant A (Amine-Ketone Antioxidant)

A condensate of acetone and diphenylamine (NON-FLEX BA manufactured by Seiko Chemical Co., Ltd.)

Antioxidant B (Long Alkyl Chain Substituted Diphenylamine Antioxidant)

Octylated diphenylamine (NOCLAC AD manufactured by Ouchi Shinko Chemical Industrial Co., Ltd.)

Antioxidant C

N-phenyl-N'-isopropyl-p-phenylenediamine (OZONONE 3C manufactured by Seiko Chemical Co., Ltd.)

Vulcanizing Agent A 2-mercaptoimidazoline (SANCELER 22C manufactured by Sanshin Chemical Industry Co., Ltd.)

Vulcanizing Agent B 2-mercaptobenzimidazole (NOCLAC MB manufactured by Ouchi Shinko Chemical Industrial Co., Ltd.)

Vulcanization Accelerator

Tetramethylthiuram disulfide (SANCELER TT manufactured by Sanshin Chemical Industry Co., Ltd.) Characteristics of the products of Examples and Comparative Examples thus obtained were evaluated in accordance with criteria to be described below. The results of the evaluations were also shown in Tables 3 and 4 below.

Extrudability

The outer layer materials were extruded, and the extrudability thereof was evaluated. The extrudability of an outer layer material which had a good surface texture as a result of visual inspection was evaluated as being "good" (indicated by an open circle), and that of an outer layer material which did not have a good surface texture was evaluated as being "unacceptable" (indicated by a cross).

Tensile Properties

The outer layer materials were pressed at 150° C. for 30 minutes, and were cut using a JIS (Japanese Industrial Standards) No. 5 dumbbell die. Thus, rubber sheets having a thickness of 2 mm were produced. The tensile strength (TS), tensile elongation (EB) and hardness (HA) of the rubber sheets were measured in accordance with JIS K 6251. The tensile strength (TS) is preferably not less than 10.0 MPa. The tensile elongation (EB) is preferably not less than 300%. The hardness (HA) is preferably in the range of 65 to 75.

Ozone Resistance

The ozone resistance of the hoses was evaluated in accordance with JIS D 2607. A hose which did not have any cracks and any appearance anomalies was evaluated as being "good" (indicated by an open circle), and a hose which had above problems was evaluated as being "unacceptable" (indicated by a cross).

Adhesion to Inner Layer

The adhesive strength of the hoses was measured in a manner to be described below. The hoses were cut at right angles to the axial direction thereof so that ring-shaped test specimens having a width of 25 mm±0.5 mm were prepared. Outer layer portions of the test specimens were peeled, held in a chuck, and stretched at a rate of 25 mm±0.5 mm per minute by using a tension tester. The minimum load measured until the specimens (or hoses) made one rotation and were peeled was defined as the adhesive strength (N/mm) thereof. A specimen which had an adhesive strength of not less than 2.3 (N/mm) to the inner layer (of NBR) was evaluated as being "good" (indicated by an open circle), and a specimen which had an adhesive strength of less than 2.3 (N/mm) was evaluated as being "unacceptable" (indicated by a cross).

Fuel Oil Resistance

The fuel oil resistance of rubber pieces taken from the respective hoses was evaluated in accordance with JIS K 6258. IRM 903 was used as a fuel for immersion. The rubber pieces were immersed in the fuel under an atmosphere at 100° C. for 168 hours. A rubber piece which had ΔV of less than 100% was evaluated as being "good" (indicated by an open circle). A rubber piece which had ΔV in the range of 100% to 110% was evaluated as being "relatively poor but acceptable" (indicated by a triangle). A rubber piece which had ΔV greater than 110% was evaluated as being "unacceptable" (indicated by a cross).

TABLE 3

| | Example | | | | |
|---|---|---|---|---|---|
| | 1 | 2 | 3 | 4 | 5 |
| Extrudability | ○ | ○ | ○ | ○ | ○ |
| Tensile TS (MPa) | 12.2 | 11.2 | 10.2 | 11.4 | 11.0 |
| Properties EB (%) | 390 | 360 | 340 | 350 | 330 |
| Hardness (HA) | 70 | 70 | 68 | 70 | 69 |
| Ozone Resistance | ○ | ○ | ○ | ○ | ○ |
| Adhesion to Inner Layer | ○ | ○ | ○ | ○ | ○ |
| Adhesive Strength (N/mm) | 2.4 | 3.3 | 3.2 | 2.9 | 2.3 |
| Fuel Oil Resistance | ○ | ○ | Δ | ○ | ○ |
| ΔV (%) | 61 | 75 | 108 | 77 | 79 |

TABLE 4

| | Comparative Example | | | |
|---|---|---|---|---|
| | 1 | 2 | 3 | 4 |
| Extrudability | ○ | ○ | X | ○ |
| Tensile TS (MPa) | 13.6 | 5.6 | 11.2 | 10.1 |
| Properties EB (%) | 380 | 260 | 320 | 350 |
| Hardness (HA) | 70 | 66 | 71 | 66 |
| Ozone Resistance | X | ○ | ○ | ○ |
| Adhesion to Inner Layer | X | ○ | ○ | X |
| Adhesive Strength (N/mm) | 1.3 | 2.4 | 2.6 | 1.4 |
| Fuel Oil Resistance | ○ | X | ○ | Δ |
| ΔV (%) | 50 | 149 | 76 | 101 |

The results in Tables 3 and 4 showed that the products of Examples 1 through 5 were good in extrudability, tensile properties, ozone resistance, adhesion to the inner layer and fuel oil resistance.

The product of Comparative Example 1, on the other hand, was poor in ozone resistance and adhesion to the inner layer because the outer layer material did not employ the specific EPDM. The product of Comparative Example 2 was poor in tensile properties and fuel oil resistance because the outer layer material included small amount of CR (or large amount of EPDM-A). The product of Comparative Example 3 was poor in extrudability because the outer layer material employed the EPDM-a having a high Mooney viscosity. The product of Comparative Example 4 was poor in adhesion to the inner layer because the outer layer material employed the EPM (containing 0% by weight of ENB).

Example 6

Preparation of Inner Layer Material

An inner layer material was prepared by kneading 100 parts by weight of FKM (DAI-EL G555 manufactured by Daikin Industries, Ltd.), 15 parts by weight of carbon black (SEAST S manufactured by Tokai Carbon Co., Ltd.), 5 parts by weight of MgO (KYOWA MAG #150 manufactured by Kyowa Chemical Industry Co., Ltd.), 2 parts by weight of 2,5-dimethyl-2,5-di(t-butylperoxy)hexane (PERHEXA 25B-40 manufactured by NOF Corporation) as an organic peroxide cross-linking agent, 1 part by weight of triallyl isocyanurate (TAIC manufactured by Nippon Kasei Chemical Co., Ltd.) as a co-cross-linking agent and 5 parts by weight of ethylene glycol dimethacrylate (HI-CROSS ED manufactured by Seiko Chemical Co., Ltd.) as a co-cross-linking agent together by using a kneader.

Preparation of Outer Layer Material

An outer layer material was prepared in a manner similar to the outer layer material of Inventive Example 2 shown in Table 1.

Production of Hose

A hose (having an inside diameter of 8.7 mm and an outside diameter of 17.5 mm) in which a reinforcing fiber layer was formed on an outer peripheral surface of a tubular inner layer (having a thickness of 3.0 mm) and an outer layer (having a thickness of 1.2 mm) was formed on an outer peripheral surface of the reinforcing fiber layer was prepared in a manner similar to Example 1 except that the above-mentioned inner and outer layer materials were used.

Example 7

Preparation of Inner Layer Material

An inner layer material was prepared by kneading 100 parts by weight of ECO (manufactured by ZEON Corporation), 50 parts by weight of carbon black (SEAST so manufactured by Tokai Carbon Co., Ltd.), 5 parts by weight of a plasticizer (ADK CIZER RS-107 manufactured by ADEKA Corporation), 1 part by weight of an antioxidant (NOCLAC NBC manufactured by Ouchi Shinko Chemical Industrial Co., Ltd.), 3 parts by weight of a processing aid (EMASTER 510P manufactured by Riken Vitamin Co., Ltd.), 1 part by weight of a DBU salt of naphthoic acid (DA-500 manufactured by Daiso Co., Ltd.), 3 parts by weight of an acid receiver (DHT-4A manufactured by Kyowa Chemical Industry Co., Ltd.), 1 part by weight of a vulcanizing agent (SANCELER 22C manufactured by Sanshin Chemical Industry Co., Ltd.) 1.2 parts by weight of a peptizing agent (NOCTIZER SS manufactured by Ouchi Shinko Chemical Industrial Co., Ltd.), and 0.1 part by weight of sulfur (a vulcanizing agent) (Sulfax T-10 manufactured by Karuizawa Seirensho Kabushiki Kaisha) together by using a kneader.

Preparation of Outer Layer Material

An outer layer material was prepared in a manner similar to the outer layer material of Example 2 shown in Table 1.

Production of Hose

A hose (having an inside diameter of 8.7 mm and an outside diameter of 17.5 mm) in which a reinforcing fiber layer was formed on an outer peripheral surface of a tubular inner layer (having a thickness of 3.0 mm) and an outer layer (having a thickness of 1.2 mm) was formed on an outer peripheral surface of the reinforcing fiber layer was prepared in a manner similar to Example 1 except that the above-mentioned inner and outer layer materials were used.

Example 8

Preparation of Inner Layer Material

An inner layer material was prepared by kneading 100 parts by weight of ACM (NIPOL AR31 manufactured by ZEON Corporation), 1 part by weight of a processing aid (LUNAC S30 manufactured by Kao Corporation), 65 parts by weight of carbon black (SEAST SO manufactured by Tokai Carbon Co., Ltd.), 5 parts by weight of a plasticizer (ADK CIZER RS-735 manufactured by ADEKA Corporation), 2 parts by weight of an antioxidant (NAUGARD 445 manufactured by Crompton Corporation) and 1.5 parts by weight of a vulcanizing agent (VULNOC AB manufactured by Ouchi Shinko Chemical Industrial Co., Ltd.) together by using a kneader.

Preparation of Outer Layer Material

An outer layer material was prepared in a manner similar to the outer layer material of Example 2 shown in Table 1.

Production of Hose

A hose (having an inside diameter of 8.7 mm and an outside diameter of 17.5 mm) in which a reinforcing fiber layer was formed on an outer peripheral surface of a tubular inner layer (having a thickness of 3.0 mm) and an outer layer (having a thickness of 1.2 mm) was formed on an outer peripheral surface of the reinforcing fiber layer was prepared in a manner similar to Example 1 except that the above-mentioned inner and outer layer materials were used.

Comparative Example 5

Preparation of Inner Layer Material

An inner layer material was prepared in a manner similar to the inner layer material of Example 6.

Preparation of Outer Layer Material

An outer layer material was prepared in a manner similar to the outer layer material of Comparative Example 1 shown in Table 2.

Production of Hose

A hose (having an inside diameter of 8.7 mm and an outside diameter of 17.5 mm) in which a reinforcing fiber layer was formed on an outer peripheral surface of a tubular inner layer (having a thickness of 3.0 mm) and an outer layer (having a thickness of 1.2 mm) was formed on an outer peripheral surface of the reinforcing fiber layer was prepared in a manner similar to Example 1 except that the above-mentioned inner and outer layer materials were used.

Comparative Example 6

Preparation of Inner Layer Material

An inner layer material was prepared in a manner similar to the inner layer material of Example 7.

Preparation of Outer Layer Material

An outer layer material was prepared in a manner similar to the outer layer material of Comparative Example 1 shown in Table 2.

Production of Hose

A hose (having an inside diameter of 8.7 mm and an outside diameter of 17.5 mm) in which a reinforcing fiber layer was formed on an outer peripheral surface of a tubular inner layer (having a thickness of 3.0 mm) and an outer layer (having a thickness of 1.2 mm) was formed on an outer peripheral surface of the reinforcing fiber layer was prepared in a manner similar to Example 1 except that the above-mentioned inner and outer layer materials were used.

Comparative Example 7

Preparation of Inner Layer Material

An inner layer material was prepared in a manner similar to the inner layer material of Example 8.

Preparation of Outer Layer Material

An outer layer material was prepared in a manner similar to the outer layer material of Comparative Example 1 shown in Table 2.

Production of Hose

A hose (having an inside diameter of 8.7 mm and an outside diameter of 17.5 mm) in which a reinforcing fiber layer was formed on an outer peripheral surface of a tubular inner layer (having a thickness of 3.0 mm) and an outer layer (having a thickness of 1.2 mm) was formed on an outer peripheral surface of the reinforcing fiber layer was prepared in a manner similar to Example 1 except that the above-mentioned inner and outer layer materials were used.

The adhesion to the inner layer of each of the thus obtained products of Inventive Examples and Comparative Examples was evaluated in accordance with the above-mentioned criteria. The results were shown in Table 5 below. The adhesion to the inner layer of FKM of a product which had an adhesive strength to the inner layer of FKM of not less than 1.4 (N/mm) was evaluated as being "good" (indicated by an open circle), and that of a product which had an adhesive strength of less than 1.4 (N/mm) was evaluated as being "unacceptable" (indicated by a cross) The adhesion to the inner layer of ECO of a product which had an adhesive strength to the inner layer of ECO of not less than 2.0 (N/mm) was evaluated as being "good" (indicated by an open circle), and that of a product which had an adhesive strength of less than 2.0 (N/mm) was evaluated as being "unacceptable" (indicated by a cross). The adhesion to the inner layer of ACM of a product which had an adhesive strength to the inner layer of ACM of not less than 2.0 (N/mm) was evaluated as being "good" (indicated by an open circle), and that of a product which had an adhesive strength of less than 2.0 (N/mm) was evaluated as being "unacceptable" (indicated by a cross).

TABLE 5

|  | Example | | | Comparative Example | | |
| --- | --- | --- | --- | --- | --- | --- |
|  | 6 | 7 | 8 | 5 | 6 | 7 |
| Adhesion to Inner Layer | ○ | ○ | ○ | X | X | X |
| Adhesive Strength (N/mm) | 1.5 | 2.9 | 2.5 | 0.6 | 1.9 | 1.9 |

The results in Table 5 showed that the products of Examples 6 through 8 were good in adhesion to the inner layer.

The products of Comparative Examples 5 through 7, on the other hand, were poor in adhesion to the inner layer.

The rubber composition for the automotive non-water liquid delivery hose according to the present invention is used as a rubber composition for an automotive non-water liquid delivery hose such as a vacuum brake hose, a fuel hose, an oil hose and the like.

While the invention has been described in detail, the foregoing description is in all aspects illustrative and not restrictive. It is understood that numerous other modifications and variations can be devised without departing from the scope of the invention.

What is claimed is:

1. A rubber composition for an automotive non-water liquid delivery hose comprising:
    (A) chloroprene rubber; and
    (B) ethylene-propylene-diene terpolymer containing 3% to 11% by weight of ethylidene norbornene and having a Mooney viscosity ($ML_{1+4}$ at 100° C.) in the range of 20 to 150,
    wherein the mixture ratio by weight of the component (A) and the component (B) is set in the range of (A)/(B)=97/3 to 75/25.

2. An automotive non-water liquid delivery hose comprising:
    a tubular inner layer;
    a reinforcing fiber layer formed on an outer peripheral surface of the tubular inner layer; and
    an outer layer formed on an outer peripheral surface of the reinforcing fiber layer,
    the tubular inner layer containing as an essential component at least one selected from the group consisting of acrylonitrile-butadiene rubber, fluoro rubber, acrylic rubber and hydrin rubber,
    the outer layer being made of a rubber composition containing
    (A) chloroprene rubber, and
    (B) ethylene-propylene-diene terpolymer containing 3% to 11% by weight of ethylidene norbornene and having a Mooney viscosity ($ML_{1+4}$ at 100° C.) in the range of 20 to 150,
    wherein the mixture ratio by weight of the component (A) and the component (B) is set in the range of (A)/(B)=97/3 to 75/25.

3. The automotive non-water liquid delivery hose according to claim 2, formed as a vacuum brake hose, a fuel hose or an oil hose.

* * * * *